United States Patent [19]

Gooden et al.

[11] 4,357,128
[45] Nov. 2, 1982

[54] CONVEYING SYSTEM

[75] Inventors: Eldon D. Gooden, Chesterfield County; James P. Reed, Henrico County, both of Va.

[73] Assignee: Mactavish Machine Manufacturing Co., Richmond, Va.

[21] Appl. No.: 155,223

[22] Filed: Jun. 2, 1980

[51] Int. Cl.$^3$ ............................................. B65G 25/02
[52] U.S. Cl. .................................... 414/156; 198/751; 198/774
[58] Field of Search ............... 414/156, 180, 198, 392, 414/399; 198/774, 775, 751; 193/35 SS

[56] References Cited

U.S. PATENT DOCUMENTS

| | | | |
|---|---|---|---|
| 2,168,527 | 8/1939 | Iversen | 414/180 |
| 2,828,077 | 3/1958 | Stevenson et al. | 193/35 SS |
| 3,736,997 | 6/1973 | Bottorf | 198/774 X |
| 4,238,026 | 12/1980 | Mrugala et al. | 198/751 X |

Primary Examiner—Robert G. Sheridan
Attorney, Agent, or Firm—LeBlanc, Nolan, Shur & Nies

[57] ABSTRACT

A conveyor system with an automatic operating capability is disclosed. The system is particularly adapted to conveying articles into a steam chamber, vessel, oven or the like and retrieving articles after treatment therein. The system includes a truck driven horizontally, preferably by a chain drive along tracks which extend from a pick-up point, into the chamber, or through the chamber, to a deposit point. The bed of the truck is elevated or depressed, preferably pneumatically, and the system further includes opposed rail members disposed parallel to the tracks, outboard of the tracks, and at an elevation slightly above that of the truck bed in its deflated or depressed condition. Articles to be conveyed are sequentially loaded on the forward end of the truck, the truck bed elevated, and the articles conveyed horizontally to a desired point. The truck bed is then deflated or depressed to deposit the articles on the opposed rails.

8 Claims, 12 Drawing Figures

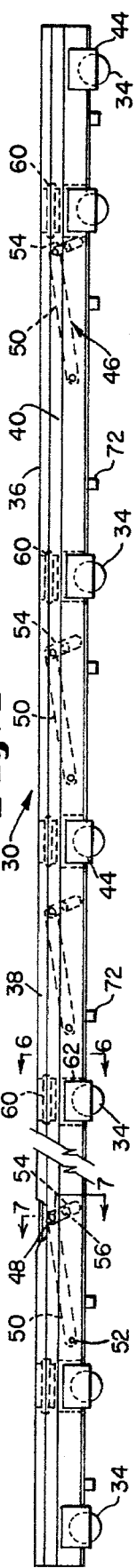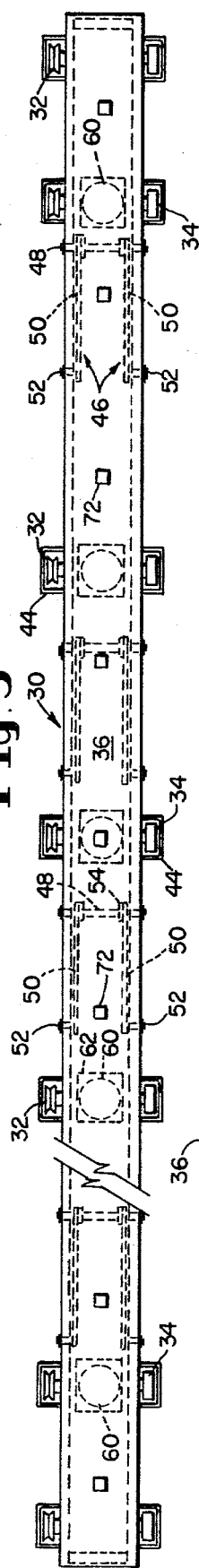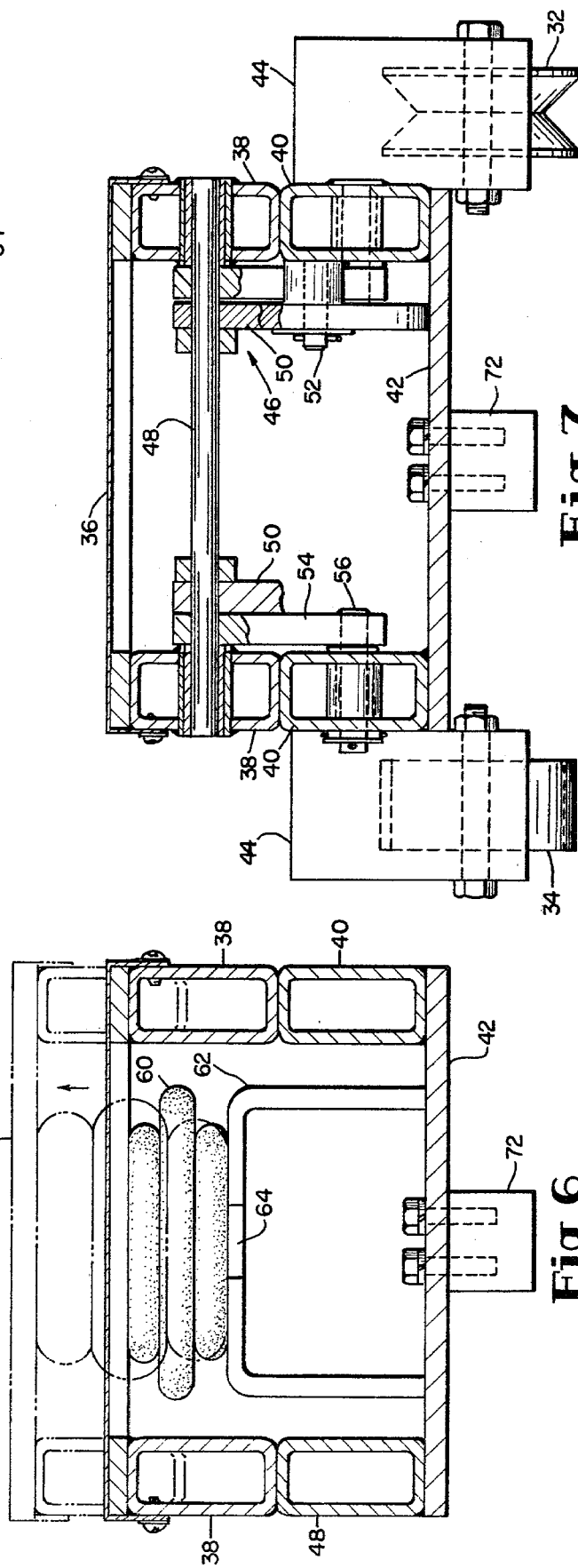

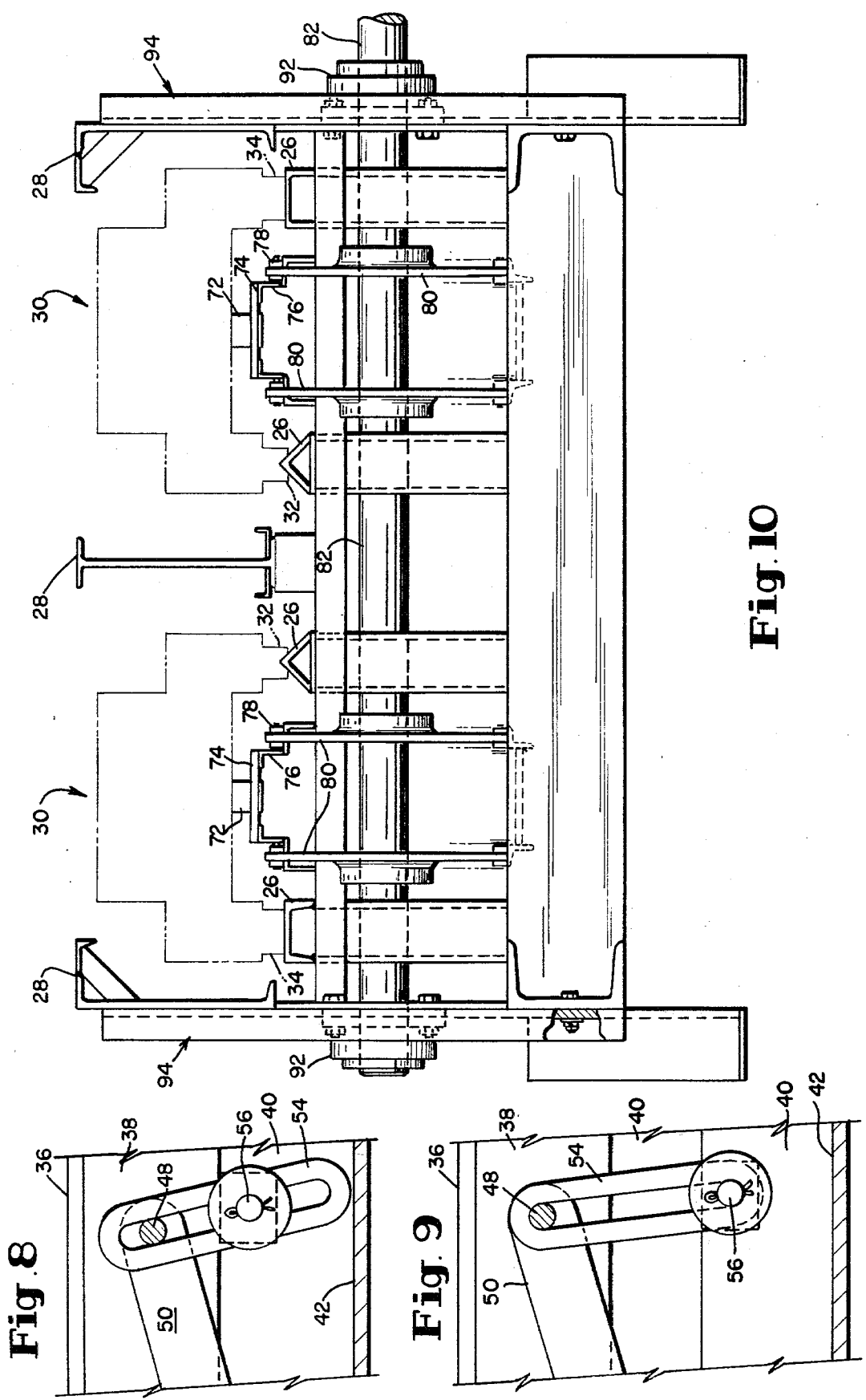

CONVEYING SYSTEM

This invention relates to a conveying system ideally suited for conveying tobacco into a steam chamber for steam treating. After steam treating, the conveyor then enters the chamber and retrieves the tobacco whereby it is transmitted to a deposit point such as a thresher. As will be obvious to those skilled in the art upon further consideration of the foregoing, the conveyor of this invention is particularly suited for use in conveying any type of article into a vessel, steam chamber, oven, autoclave, or the like. Accordingly, this invention is not intended to be limited to the conveying of tobacco, although a preferred embodiment thereof is particularly suited to conveying tobacco as will be subsequently explained.

In the treatment of tobacco, hogshead, bales, and tubs of tobacco are normally processed in a steam chamber under vacuum. Steam may be injected into the bulk tobacco whereby the steam penetrates the tobacco to moisturize it. Following this treatment, the tobacco is then thrashed or chopped. Prior art conveyors used a fixed roller conveyor to convey containers of tobacco from a stripping location where the containers were stripped from the tobacco, into the steam chamber, and following processing from the chamber to a thrasher. See U.S. Pat. Nos. 2,591,026 and 3,437,094. The steam conditions within the chamber, however, cause rapid deterioration and corrosion of the fixed roller conveyor sections located within the chamber. Maintenance problems then often require a shut-down of the operation while conveyor sections are replaced. Replacement may be required at least annually in conventional systems. Furthermore, during the treatment of tobacco, leaves and debris occasionally fall into the fixed roller conveyor system, and removal, as is obvious to those skilled in the art, is difficult and requires hand labor to achieve.

Accordingly, there is a need for an automatic conveying system which will convey tobacco for processing and will not be subject to deterioration, corrosion, and maintenance problems.

It was discovered that a "lift and lay" conveyor, could be adapted to conveying tobacco from a stripping point through a steam chamber, to the thresher. The device of this invention essentially deposits the tobacco to be processed within the chamber and is then removed from the chamber. Following the steam operation, the device enters the chamber, retrieves the tobacco, and conveys it to the thresher or next treatment point. Therefore the device of this invention is not disposed within the chamber during the steam operation, and therefore, will not be subject to corrosion and deterioration as with the conventional fixed roller conveyor systems currently in use.

The device of this invention includes a track mounted truck, having a bed which may be sequentially raised and lowered. In a preferred embodiment of this invention, the truck is driven by a chain drive system disposed beneath the truck, between the tracks to achieve horizontal movement. Vertical movement of the bed is achieved through the use of a plurality of pneumatic devices known as air bags disposed beneath the bed. The bed then is automatically raised and lowered pneumatically through the use of conventional valves and a remote compressor source. Both the chain drive system and the pneumatic system for elevation and depression of the truck bed are controlled by an automatic controller so that conveying of the tobacco will essentially be automatic.

As will be obvious to those skilled in the art, it is not intended to limit this invention to a type of drive system, to pneumatically inflatable air bags, or to the particular type of controller utilized. Conventional systems may be substituted within the scope of this invention.

The conveyor truck of this invention has been referred to hereinabove as a "lift and lay" type conveyor. Related conveying systems are known in the art and have been referred to variously as lift and lay conveyors or walking beam type conveyors. In U.S. Pat. No. 3,736,997, a walking beam or step by step reciprocating conveyor is described which uses an hydraulically operated vertical lift with a moveable carriage, also driven hydraulically. In U.S. Pat. No. 3,838,769, a lift and lay conveyor is described for delivering hogsheads or cases to a pressing station where tobacco is pressed thereinto. The device is hydraulically operated. Both conveyors systems, however, differ substantially in design and in functioning from the instant invention. In operation, the preferred embodiment of this invention functions to load the truck with articles sequentially until the entire truck is loaded. In each sequential operation, the forward or loading portion of the truck emerges from between the outboard rails and receives an article. The truck bed is then elevated and retracted until the end portion registers on the end of the rails. The truck bed is then deflated to deposit the article on the rails. As the above described movement is repeated sequentially, when the truck is retracted in an elevated position, articles previously deposited on the rails are picked-up and moved back until the rails support sufficient articles to fill the truck bed. The truck is then elevated to pickup the articles from the rails and translate horizontally along tracks between the rails into the processing chamber. The truck bed is then deflated or depressed to deposit the articles on rails within the chamber, and the truck bed retrieved from the chamber to repeat the loading process during processing.

After processing, the truck may reenter the chamber, pick-up the articles and convey them from the chamber, or preferably a second truck may be used to enter the chamber pick the articles up from the rails, and convey them from the chamber.

In an alternative embodiment of this invention, the truck bed is not moveable vertically. Instead, the rails are supported by the pneumatic system. In this embodiment, in the deflated condition, the surface of the truck bed would be slightly higher than the surface of the rails.

Accordingly, it is an object of this invention to provide a lift and lay conveyor system which is particularly adapted to the conveying of articles into a chamber for treatment in retrieving the articles after treatment.

It is another object of this invention to provide a lift and lay conveyor system for conveying and retrieving tobacco into and out of a steam treatment chamber which conveyor is not subject to the corrosive action of the steam during treatment.

It is yet another object of this invention to provide a lift and lay conveyor which consists of a truck driven along tracks disposed between rails which may be sequentially operated, automatically, to load, convey and unload articles.

It is yet another object of this invention to provide a lift and lay conveyor system for hogsheads, bales, or tubs of tobacco which can be automatically sequentially loaded, conveyed horizontally into a steam treatment chamber and deposited therein for vacuum and steam treatment, and which subsequently, following treatment, will reenter the chamber, retrieve the tobacco, and convey the tobacco to a subsequent processing station.

These and other objects will become readily apparent with reference to the drawings and following descriptions wherein:

FIG. 4 is a side elevation of the conveyor truck with portions removed;

FIG. 5 is a plan view similar to FIG. 4 of the conveyor truck of this invention;

FIG. 6 is a cross-sectional view taken along line 6—6 of FIG. 4;

FIG. 7 is a cross-sectional view taken along line 7—7 of FIG. 4;

FIG. 8 is a fragmentary side elevation of a portion of a positive stop linkage in the conveyor truck when the truck bed is in the deflated condition;

FIG. 9 is a view similar to FIG. 8 showing the linkage when the truck bed is in the inflated or elevated position;

FIG. 10 is a typical cross-section of the conveyor system of this invention showing the trucks in phantom to illustrate the drive system therefore;

Figure 2:
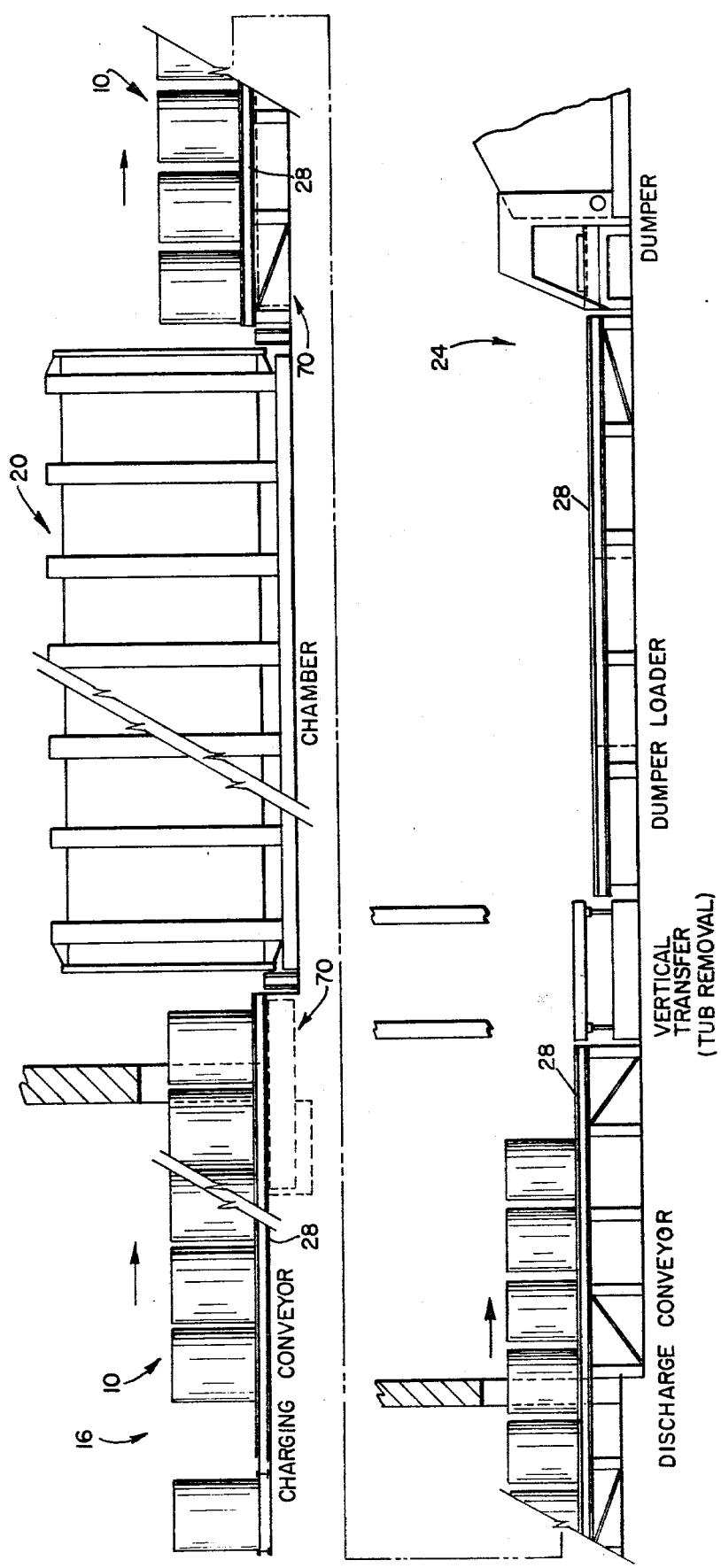
FIG. 2 is a side elevation with portions removed of the conveyor system of this invention.
Figure 3:
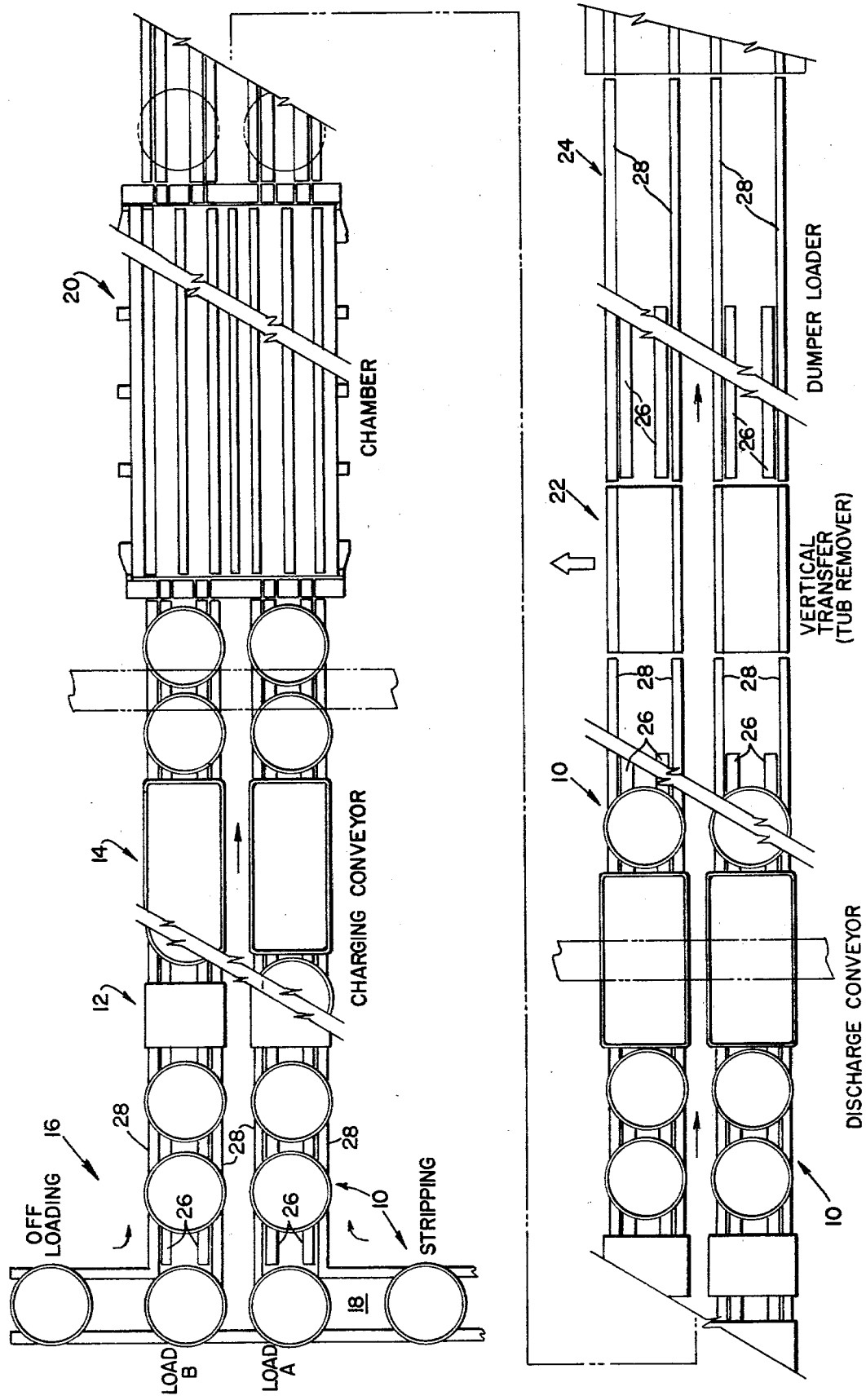
FIG. 3 is a plan view of the device of this invention with portions removed similar to FIG. 2.

With attention to FIGS. 2 and 3, in a preferred embodiment of this invention adapted to conveying bulk tobacco, such tobacco is previously pressed into hogsheads, bales, or into tubs which are twice as long as hogsheads. At a stripping section (not shown) the outer containers are removed from hogsheads or bales leaving the pressed tobacco in cylindrical form 10 or in bale form 12 resting on wooden platforms (not shown). The tubs 14 along with the cylindrical or square bulk tobacco objects are conveyed from the stripping section by conventional means to a loading section generally indicated 16 for the conveying system of this invention. The tobacco is off loaded from the conventional conveyor 18 and transferred according to the conveyor of the instant invention, as will be subsequently explained, to a steam chamber 20 where it is steamed. Subsequently, the tobacco is conveyed from the chamber to a vertical transfer or tub removal station 22 of conventional design and subsequently to a dumper loader also of conventional design 24 and ultimately to a thresher or chopper (not shown).

The system of this invention includes a pair of tracks 26 with a pair of outboard rail members 28 disposed adjacent each pair of tracks 26. The rail members 28 may be eyebeams, channels, or the like and are sufficiently separated to support the bulk tobacco as shown in FIG. 3.

Bulk tobacco then forms a conventional conveyor, is off loaded onto a charging conveyor at 16, conveyed into a steam chamber 20, and subsequently conveyed to a discharge conveyor. The bulk tobacco is then conveyed to a dumper loader 24 where it is dumped into a thrasher or chopper, and the tubs removed by a conventional tub remover 22.

With attention to FIGS. 4–7, the conveyor truck 30 of this invention is wheel-mounted on preferably opposed grooved wheels 32 and flat wheels 34 which ride in corresponding tracks 26. The truck of this invention includes a flatbed 36 supported, vertically, by horizontal support members 38 on either side thereof. Horizontal support members 38 affixed to the truck bed 36 are in turn supported by an undercarriage consisting of horizontal support members 40, which in turn are affixed to a base plate 42 which, as will be subsequently described, is associated with the drive system. Wheels 32 and 34 are preferably enclosed in a housing 44. Housing 44 is in turn affixed to the horizontal support members 40 on base plate 42.

In the embodiment shown, horizontal support members 38 and in turn the truck bed 36 are interconnected to the horizontal support members 40 and their supporting base plate 42 by a positive stop linkage 46. Linkage 46 is intended to prevent wobble between the bed 36 and supporting undercarriage base plate 42 and to ensure that when the bed is elevated, it will not tilt. As shown at FIGS. 4–7, and in fragmentary views FIGS. 8 and 9, the linkage 46 includes a shaft 48 which extends between parallel horizontal support members 38. Elongated link members 50 interconnect members 38 and 40 extending between shaft 48 and a shaft 52 similarly mounted in horizontal support member 40. A second, slotted link 54 extends between shaft 48 and a third shaft 56 mounted similarly in horizontal support members 40. Therefore, the linkage 46 achieves both lateral and vertical stability whereby, as will be subsequently explained, when the truck bed is raised as shown in FIG. 6 or FIG. 9, the bed will not wobble relative to the undercarriage and base plate 42 and the bed will raise at a relatively constant elevation rate throughout its entire length.

With attention to FIG. 6, the preferred elevation device of the instant invention is a pneumatic device known as an air bag. Suitable devices are manufactured by the Firestone Tire and Rubber Company and identified as Model No. 131. A plurality of air bags 60 are mounted on U-shaped housings 62 which in turn are supported by base plate 42. Air to inflate the device is supplied from a remote location (not shown) through hose reels (also not shown) connected at port 64 to each bag. Retractable hose reels are available through the Aero Motive Corporation and a wide variety of models may be adapted to this specific use. As is well known in the art, activation and deactivation of the pneumatic device is achieved by conventional valves, which in turn are preferably controlled by a automatic controller as will be subsequently described.

It should be understood that electric motors with various forms of rotary or linear translation may be substituted for the air bags shown to raise and lower the bed 36. In addition, hydraulic devices could also be utilized, and therefore this invention comprehends any conventional type of elevation drive system. It is preferred, however, to use the pneumatic system shown.

Figure 11:
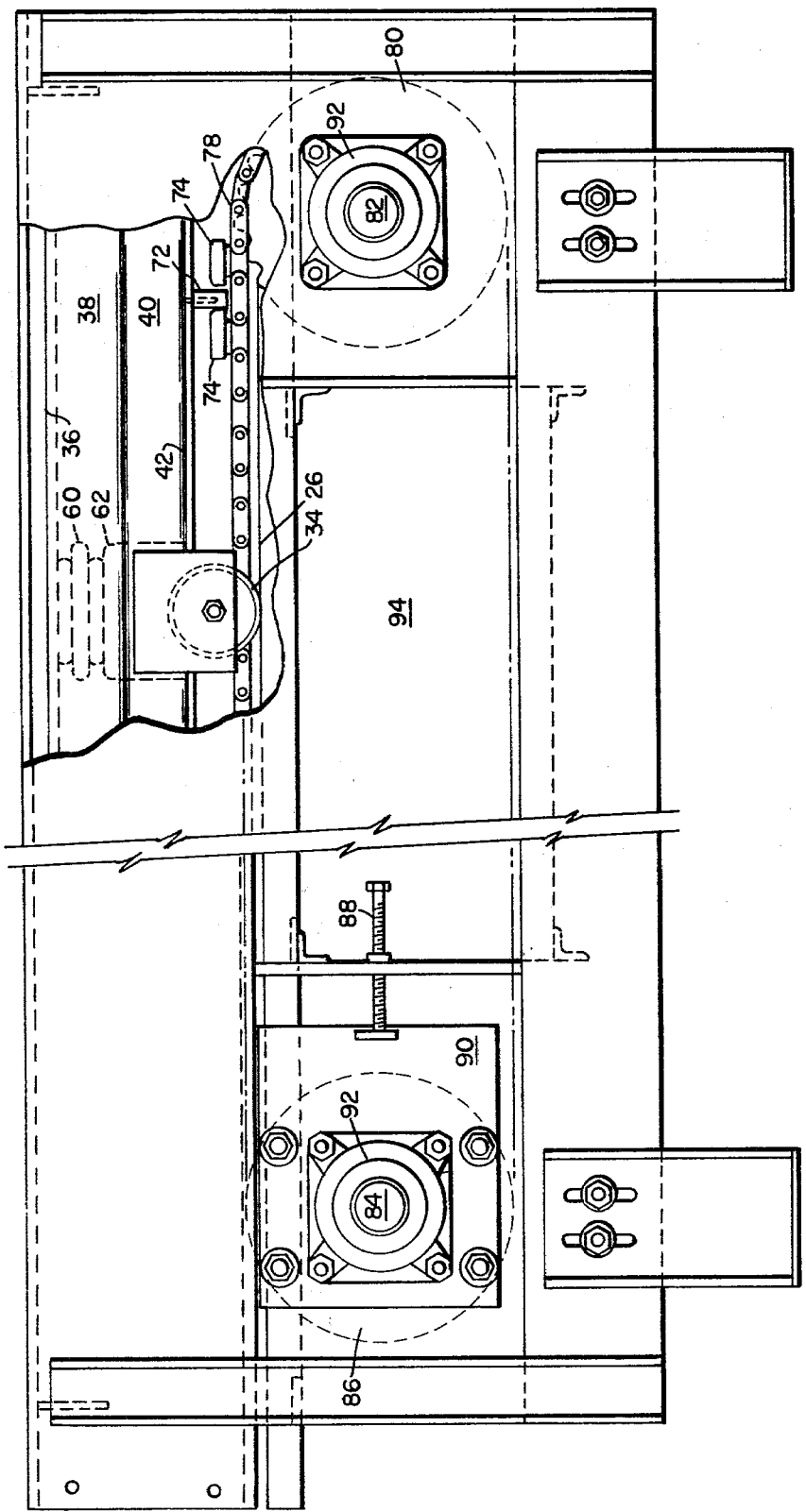
FIG. 11 is a side elevation fragmentary view with portions removed illustrating the drive system of this invention.
Figure 12:
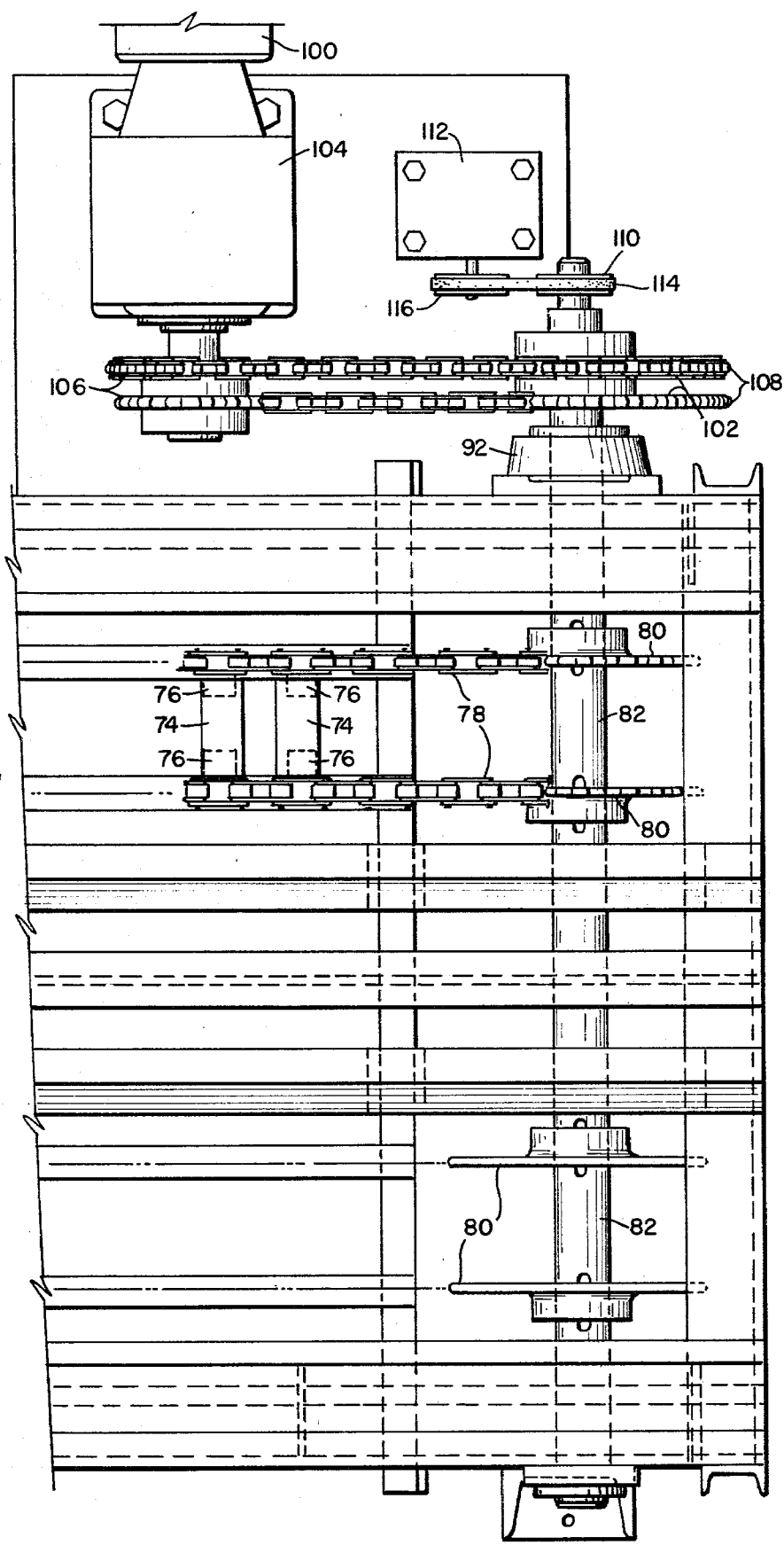
FIG. 12 is a plan view similar to FIG. 11 with the trucks and portions removed to illustrate the drive system of this invention.

With reference to FIGS. 10–12, and to FIG. 2, the drive system 70 shown generally in phantom in FIG. 2, is preferably a chain drive mounted beneath the carriage 30, between tracks 26. A plurality of teeth 72 depend from the lower plate 42 of truck 30.

As shown in FIG. 11, teeth 72 are captured between drive lugs 74 which in turn are attached by drive links 76 to chains 78. Chains 78 are driven by a pair of sprocket wheels 80 mounted on a driving shaft 82. A cooperating driven shaft 84 mounts corresponding sprocket wheels 86 in a mounting assembly 90. Assembly 90 maintains the chains 78 in the desired degree of tension by a set screw or pressure bolt 88 used to manually adjust the chain tension. Shafts 82 and 84 are mounted with conventional bearings 92 on vertical support walls 94.

In specific reference to FIG. 12, shaft 82 is preferably driven by a variable speed motor 100. A preferred motor is WER Moder ES150 ARG manufactured by WER Industrial Division, Emerson Electric, Grand New York. Shaft 82 preferably mounts twin sprocket wheels 102. Motor 100 is then connected through a gear reducer 104 and corresponding sprocket wheels 106 to a pair of chains 108. Motor 100 then is preferably capable of low speed, high speed and acceleration whereby truck 30 may be driven smoothly without abrupt starts and stops. If desired, shaft 82 may also mount a pulley 110 which drives an encoder 112 through a belt 114 and a corresponding pulley 116 on the encoder 112.

As previously indicated, the device of this invention is intended to be automated. In one embodiment, a drum programmer is used. A preferable design is an ATC Model 182OBO1Q20X manufactured by Automatic Timing and Controls Company, King of Prussia, Pa. an alternative, preferred embodiment utilizes a programmable controller. A preferable controller is available through Gould-Modicon Division, York and Haverhill St., Andover, Mass.

Figure 1:
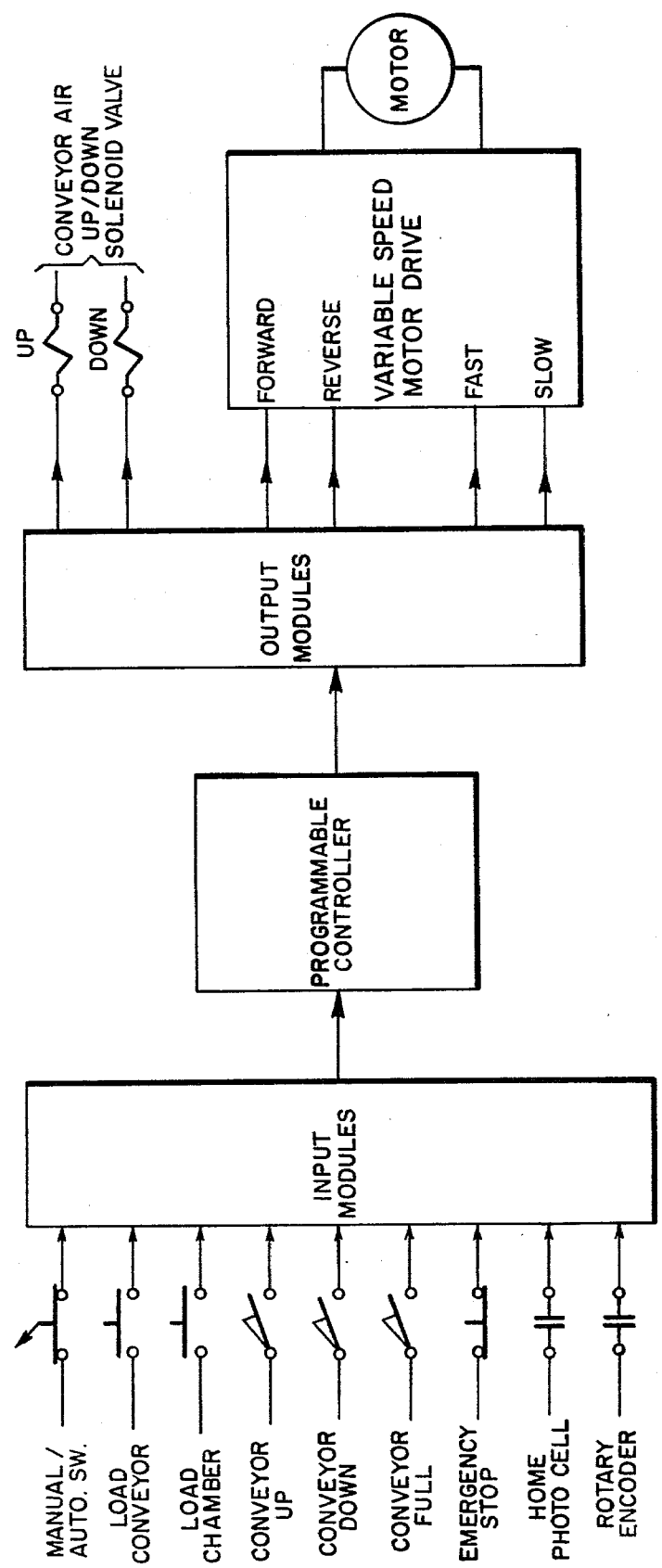
FIG. 1 is a block diagram illustrating the inputs and outputs with reference to a preferred controller system for the conveyor of this invention.

As shown in FIG. 1, the controller receives input from a variety of sources which monitor the system. Obviously, the number of inputs and outputs may be varied within the scope of this invention. In the preferred embodiment of this invention, the programmable controller is a Modicon Model 484. This unit is capable of performing the sequential system control preferred for the device of this invention as follows:

1. Initially, the conveyor is at rest in its "home" position (a position selected to provide the lesser amount of travel in the combined positioning requirements of the application and a position to which the conveyor will always return after each traverse). The trucks are in the down position with the air stroke Model No. 131 air bags deflated and are stationary.

2. Upon a load command (electrical signal) to the programmable controller (hereinafter PC) the PC will cause the trucks to elevate, lifting a hogshead or bulk tobacco container vertically from stationary rails 18.

3. When the trucks 30 are fully elevated, (as detected by a pressure switch in the air line feeding the air bags 60 or in other designs by a limit switch) a signal is provided to the PC indicating that forward motion is to be performed.

4. The PC generates signals to control (preferably) a 2-speed reversible DC drive, in turn, operates a DC motor 100 attached to the drive mechanism. The DC drive preferably is equipped with a "soft start" feature which causes the trucks to accelerate at a controlled rate. As the trucks move, a rotary pulse encoder 112 driven by the drive shaft 82 sends pulses to the PC where they are stored and compared with two preset counters. When the number of pulses from the encoder matches the preset number stored in the "slow down" counter, the PC causes the DC drive to switch to a slow speed operation. A short distance further when a number of pulses from the encoder equals the preset number in the "end of stroke" counter, the PC causes the DC drive to stop the truck motion and also causes the air bags to deflate.

5. When it has been detected by the PC that the air bags are down, the PC commands the DC drive to provide reverse motion. The trucks 30 then move back to the "home" position, ready for the next hogshead. Acceleration, high speed, low speed and stop sequence through pulse input to the PC is used in the movement control for all strokes and should be assumed whenever truck movement is indicated. To avoid residual counts in the position counters of the PC, counter reset signals are generated whenever the trucks return to the "home" position. This sequence is repeated on command until the conveyor contains as many hogsheads as is desired, or is completely filled. Each command causes the newly loaded logshead and all previously loaded units to index forward.

6. When fully loaded, the conveyor is used to place the hogsheads into the chamber 20 by generating a second "charge" command. In this case, the conveyor follows the same sequence as that caused by the "load" command except that PC counters are used which stop the forward stroke when the trucks are fully in the chamber. The hogsheads are deposited on fixed rails in the chamber and the trucks then run in reverse to the "home" position. If a second truck conveyor is used to unload the chamber, its operation is a logical inversion of the loading process.

The invention as described hereinabove, comprises a conveying system. The system may include a single truck, tandem trucks, or a pair of tandem trucks track mounted and chain driven between slightly elevated rails. Each truck includes a plurality of inflatable air bags mounted below the truck bed whereby on command the truck bed may be elevated a predetermine distance and held in an elevated position for a predetermined period of time. The truck may be driven horizontally with the bed in an elevated position or with the bags deflated.

The conveying system of this invention is particularly adapted to conveying bulk tobacco into a steam treatment chamber. The invention is not intended to be limited to conveying tobacco, however, and could be utilized in a wide variety of manufacturing situations wherein it is desired to convey articles into a high temperature treatment chamber, vessel, or the like. An example might be the loading of an autoclave as used in the textile industry for dye setting. By providing the conveyor of this invention, batch continuous operation is achieved without the risk of corrosion or deterioration inherent in the prior art method of utilizing the conveyor in the treatment chamber. The traversing truck of this invention when rapidly and efficiently conveys articles to be treated into a chamber, deposits them in the chamber, and retreats from the chamber. Following treatment the truck either reenters the chamber for retrieval, or an alternate truck achieves this function.

In an alternative embodiment of this invention, the elevation capability is transferred to the rails disposed outboard of the truck, and instead of the pneumatic system, electrical or hydraulic systems are contemplated within the scope of this invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A lift and lay conveyor comprising
    a pair of stationary, mutually spaced rails, the upper surfaces thereof defining article support surfaces contained in a common horizontal plane, said rails extending from an article pick-up point into an article treatment chamber;
    a pair of stationary, mutually spaced tracks disposed between said rails and extending from the article pick-up point to the article treatment chamber;
    a conveyor truck having a plurality of wheels mounted on said tracks for horizontal movement therealong between said rails, said truck having a horizontal bed with an upper support surface and a lower carriage mounting said wheels;
    means coupled between said truck carriage and bed for raising and lowering said upper support surface vertically relative to said carriage between a first position wherein said surface is contained in a horizontal plane disposed below the rail support surface and a second position wherein said surface is contained in a horizontal plane disposed above said rail support surface, said means for raising and lowering comprising a plurality of inflatable bags mounted between and interconnecting said carriage and said bed and mutually spaced horizontally along the length of said truck; means for simultaneously inflating or deflating said bags; and stabilizing means interconnecting said bed and said carriage for maintaining said support surface in a single horizontal plane; said stabilizing means including a plurality of mutually spaced linkage assemblies, each assembly comprising: a shaft carried by said bed and extending laterally across the lower portion thereof; a pair of spaced elongated lever arms disposed below the support surface and on either side thereof, each arm rotatably mounted at one end thereof at an end of said shaft, each arm extending therefrom at an angle to the horizontal, each arm rotatably mounted at an opposite end thereof to a side of said carriage; a pair of slotted links rotatably and slidably mounted on said shaft at either end thereof, said slotted links extending downwardly therefrom at an angle to the horizontal; a pair of mounting pins rotatably and slidably extending through the slots in said links and interconnecting said links and said carriage;
    drive means coupled to said carriage for driving said truck along said tracks to displace said truck horizontally between the article pick-up point and the article treatment chamber;
    control means coupled between said drive means and said means for raising and lowering said truck support surface for selectively actuating horizontal movement of said truck and vertical movement of said truck bed relative to said carriage whereby articles may be individually conveyed by said truck from the pick-up point and deposited on said rails until a predetermined number are accumulated, and subsequently conveyed by said truck, into the chamber and deposited on the rails therein.

2. The conveyor of claim 1 wherein said drive means comprises a chain drive.

3. The conveyor of claim 2 wherein said chain drive comprises
    first and second shafts carried by said conveyor and disposed below said carriage and rotatably mounted perpendicular to the longitudinal axis of said carriage, said shafts being spaced apart at predetermined distance in a common horizontal plane;
    at least one sprocket wheel mounted on each shaft;
    an endless chain interconnecting a sproket wheel on each shaft, lug means carried by said chain;
    means carried by said carriage for interlocking with said lug means whereby movement of said chain will be translated into movement of said truck along said tracks
    motor means coupled to said first shaft for rotating said shaft in a predetermined direction.

4. The drive of claim 3 further comprising a pair of sprocket wheels mounted on each shaft and two endless chains interconnecting opposite sprocket wheels.

5. The drive of claim 4 wherein said lug means comprise a plurality of mutually spaced pairs of lugs interconnected between adjacent portions of said chains.

6. The drive of claim 5 wherein said means for interlocking comprises a plurality of mutually spaced depending teeth mounted below said carriage, each tooth adapted to interlock between a pair of lugs carried by said chains.

7. The conveyor of claim 3 wherein said motor means includes a variable speed, reversible electric motor.

8. The conveyor of claim 7 further comprising sensor means coupled between said first shaft and said control means for sensing the direction of rotation and number of cycles of rotation of said shaft.

* * * * *